No. 642,952. Patented Feb. 6, 1900.
J. M. BESS.
WATERING TROUGH.
(Application filed Nov. 1, 1899.)
(No Model.)
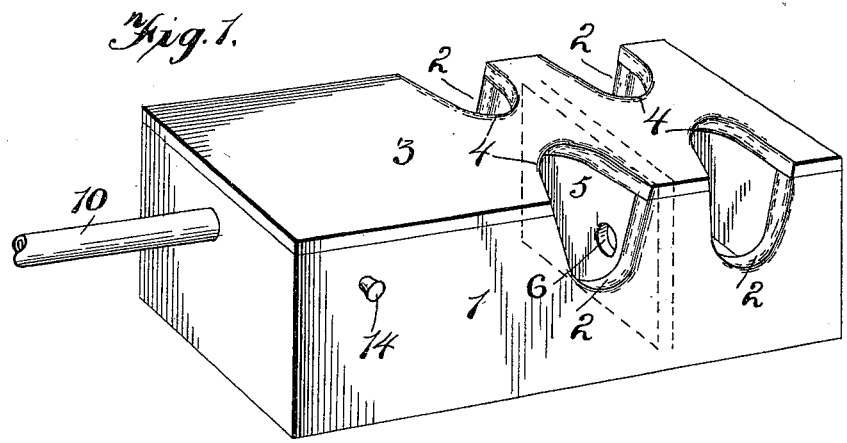
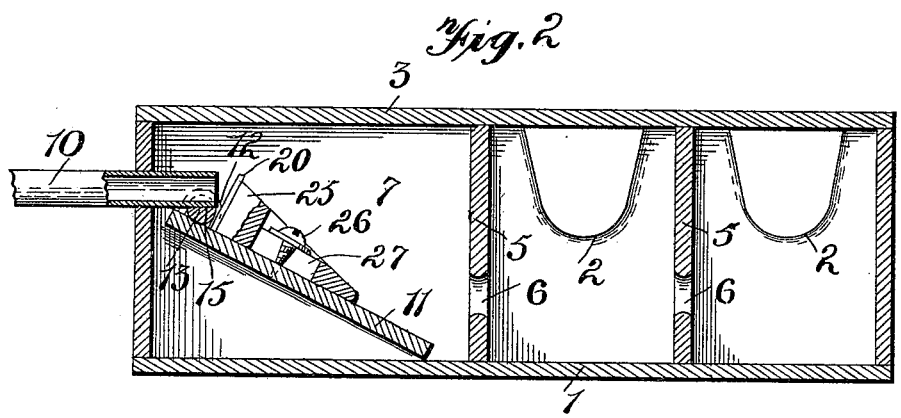
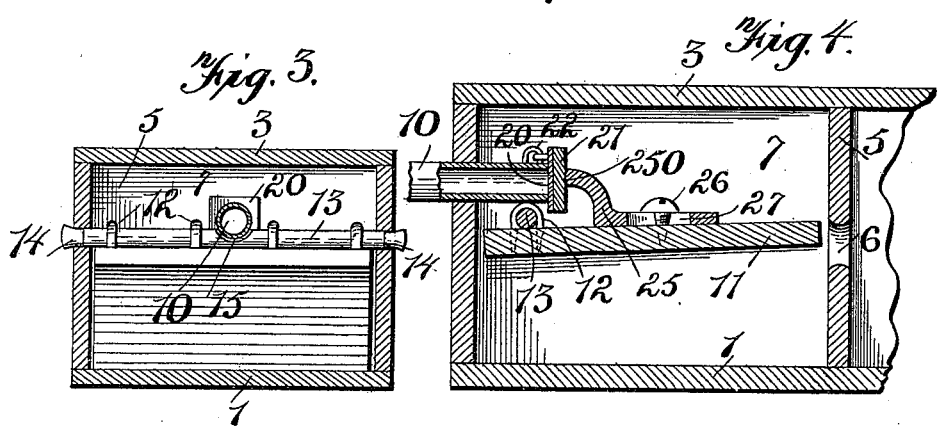
Witnesses:
Geo. E. Fuch.
R. P. Herrick.
Inventor:
Jefferson M. Bess,
by
Collamer & Co., Attorneys.

UNITED STATES PATENT OFFICE.

JEFFERSON M. BESS, OF REYNOLDS, INDIANA.

WATERING-TROUGH.

SPECIFICATION forming part of Letters Patent No. 642,952, dated February 6, 1900.

Application filed November 1, 1899. Serial No. 735,451. (No model.)

*To all whom it may concern:*

Be it known that I, JEFFERSON M. BESS, a citizen of the United States, and a resident of Reynolds, White county, State of Indiana, have invented certain new and useful Improvements in Watering-Troughs; and my preferred manner of carrying out the invention is set forth in the following full, clear, and exact description, terminating with claims particularly specifying the novelty.

This invention relates to water-distribution, and more especially to automatic tanks; and the object of the same is to produce an improved watering-trough for live stock which will automatically open the inlet, so as to admit more water when that within the trough is consumed and will automatically close the inlet before the incoming water fills the trough to overflowing.

To this end the invention consists in the specific construction of parts, as hereinafter more fully described and claimed and as shown in the accompanying drawings, wherein—

Figure 1 is a perspective view of this trough ready for use, showing two openings for stock in the nearer side. Fig. 2 is a central longitudinal section showing the trough as empty. Fig. 3 is a detail of certain parts constructed as in Fig. 2. Fig. 4 is an enlarged longitudinal section showing a slightly-different construction of certain parts.

Referring to the drawings, 1 designates the body of this trough, having openings 2 cut in its sides about where shown, and 3 is the cover thereof, having openings 4 cut in its edges, so as to register with those in the body and permit the insertion of the heads and necks of live stock. There may be more or less of these openings than shown in the present drawings, and between them, within the body, are partitions 5 with holes 6 near their lower edges, whereby all the drinking-compartments opposite the openings are connected with a main compartment 7 at one end of the body.

10 is the water-inlet pipe, passing through one end of the body into the compartment 7 above a float 11, standing therein and having staples 12 in its upper face passing over a rod 13. The latter extends across within the compartment 7 and has its ends removably engaging holes through the side walls of the body and yet made water-tight in any suitable manner, as by the insertion of plugs 14 in the outer ends of said holes. As seen in Fig. 3, this rod is preferably notched in its upper side at its center, as at 15, and into this notch extends the inner end of the pipe 10, which prevents the longitudinal movement of the rod until the pipe is first withdrawn. By this construction it will be seen that even if the rod should become loose in the holes in the sides of the body it could not accidentally move longitudinally, so as to force out a plug and permit a leak. The valve as here illustrated consists of a sheet 20, of rubber or other soft material, adapted to be pressed against the inner end of the pipe 10, and in Fig. 2 this sheet is attached directly to the end of a bracket 25, adjustably secured to the float 11, as by a screw 26, passing through a slot 27 in the bracket and into the float, whereby when the pipe wears, the sheet compresses, or the parts become differently located in use adjustment can be effected to cause the continued successful operation of the whole.

In the construction shown in Fig. 4 the sheet 20 is attached to a backing 21, which is pivoted, as by a staple, into an eye 22 on the pipe, and the bracket 25 has a projection 250, rounded on its face, which bears against the backing, as shown. The advantage in this construction over the simpler one above is that the bracket can be adjusted to a considerable extent, and yet the valve will always work flat against the end of the pipe.

I do not confine myself to the use of either construction described and shown nor to the specific details or proportions of parts; but as to sizes my preference is to make the inside dimensions of the body about six feet long by one foot wide and one foot deep, the float just large enough to fit loosely within the compartment 7 when it stands horizontal, and the openings for the stock of any desired size, but preferably eight inches wide and five inches deep and the pipe of half-inch tubing.

In use the water flows in through the pipe and finds its level throughout the trough by means of the holes 6. As it rises in the main compartment 7 the float turns pivotally around the rod until the valve is closed against the inner end of the pipe, which cuts off the supply of water. From time to time the animals put their heads through the openings and drink, and as the water falls the float descends and causes the valve to open the inlet, which remains open until the desired water-level is again reached. The cover is preferably made removable in order that access to the interior may be had when desired.

What is claimed as new is—

1. In a watering-trough, the combination with the body having openings at its sides for the heads of live stock, partitions between said openings pierced with holes near their lower edges and forming individual compartments within the body and a main compartment at one end thereof, and an inlet-pipe passing through the end of the body into said main compartment; of a float fitting loosely within said compartment, a pivotal support therefor, a bracket having a longitudinal slot, a screw passing through the same into the float, and a valve at the end of the bracket closing against the end of the pipe when the float rises, all as and for the purpose set forth.

2. In a watering-trough, the combination with a body having several individual compartments and a main compartment, a feed-pipe entering the end of the body and extending into said main compartment, and a rod across this compartment and entering holes in the sides of the body and having a notch engaged by the inner end of said pipe; of a float beneath the rod and having staples loosely embracing it so as to form a pivotal support, a bracket adjustably mounted on the float, and a valve moved by the bracket into contact with the inner end of the pipe when the float rises, substantially as described.

3. In a watering-trough, the combination with a body whose upright sides are provided with opposite holes, a transverse rod extending across the same and partly into said holes, and plugs in the outer ends of the latter; of an inlet-pipe entering the body, a float pivoted thereon, and a valve pressed against the end of the pipe by the rise of the float, as and for the purpose set forth.

4. In a watering-trough, the combination with the body, an inlet-pipe extending thereinto, a flap-valve at the end of the pipe for closing the same, and a backing behind said valve and pivotally supported by the pipe; of a float pivotally mounted within the body, and a bracket adjustably mounted on the float and having a rounded projection engaging said backing as the float rises, as and for the purpose set forth.

5. In a watering-trough, the combination with a body, a feed-pipe entering the end of the body, a rod across within the latter and entering holes in the sides of the body and having a notch engaged by the inner end of said pipe, and plugs in the outer ends of said holes; of a float beneath the rod and having staples loosely embracing it so as to form a pivotal support, a bracket on the float, and a valve moved by the bracket into contact with the inner end of the pipe when the float rises, as and for the purpose set forth.

In testimony whereof I have hereunto subscribed my signature this the 17th day of October, A. D. 1899.

JEFFERSON M. BESS.

Witnesses:
JOHN S. GRIPSNOR,
FRED J. JENNINGS.